United States Patent
Wu et al.

(10) Patent No.: US 7,130,926 B1
(45) Date of Patent: Oct. 31, 2006

(54) CONTROL PLANE FAILURE RECOVERY IN A NETWORK

(75) Inventors: Jing Wu, Ottawa (CA); Delfin Y. Montuno, Kanata (CA); Guoqiang Wang, Nepean (CA)

(73) Assignee: Nortel Networks Limited (CA)

( * ) Notice: Subject to any disclaimer, the term of this patent is extended or adjusted under 35 U.S.C. 154(b) by 843 days.

(21) Appl. No.: 09/891,011

(22) Filed: Jun. 25, 2001

Related U.S. Application Data

(60) Provisional application No. 60/279,927, filed on Mar. 29, 2001.

(51) Int. Cl.
*G06F 15/16* (2006.01)

(52) U.S. Cl. .............. 709/250; 709/238; 370/352; 370/353; 370/354; 370/355; 370/356

(58) Field of Classification Search ............. 709/238, 709/250
See application file for complete search history.

(56) References Cited

U.S. PATENT DOCUMENTS

| | | | | |
|---|---|---|---|---|
| 5,787,247 | A * | 7/1998 | Norin et al. ............. | 709/220 |
| 6,067,573 | A * | 5/2000 | Tam et al. ............... | 709/242 |
| 6,295,275 | B1 * | 9/2001 | Croslin .................. | 370/216 |
| 6,598,089 | B1 * | 7/2003 | Dumortier et al. ....... | 709/238 |
| 6,628,655 | B1 * | 9/2003 | Fieschi et al. ........... | 370/389 |
| 6,680,943 | B1 * | 1/2004 | Gibson et al. ............ | 370/392 |
| 6,714,980 | B1 * | 3/2004 | Markson et al. .......... | 709/226 |
| 6,731,639 | B1 * | 5/2004 | Ors et al. ........... | 370/395.51 |
| 2001/0005370 | A1 * | 6/2001 | Ueno ...................... | 370/393 |
| 2002/0171886 | A1 * | 11/2002 | Wu et al. ................ | 359/110 |
| 2002/0181485 | A1 * | 12/2002 | Cao et al. ................ | 370/419 |
| 2002/0196808 | A1 * | 12/2002 | Karri et al. .............. | 370/468 |
| 2003/0056007 | A1 * | 3/2003 | Katsube et al. .......... | 709/238 |
| 2004/0114595 | A1 * | 6/2004 | Doukai .................... | 370/389 |
| 2004/0202171 | A1 * | 10/2004 | Hama .................. | 370/395.1 |
| 2004/0213233 | A1 * | 10/2004 | Hong et al. .............. | 370/392 |
| 2005/0135234 | A1 * | 6/2005 | Saleh et al. .............. | 370/218 |
| 2005/0180422 | A1 * | 8/2005 | Boodaghians ............ | 370/389 |

* cited by examiner

*Primary Examiner*—Fritz Fleming
*Assistant Examiner*—Niketa Patel
(74) *Attorney, Agent, or Firm*—McGuinness & Manaras LLP

(57) ABSTRACT

Label information used by a downstream LSR is mirrored on an upstream LSR. In particular, a copy of the label information database in the downstream LSR from LDP sessions is stored on the upstream LSR. The label information database and corresponding mirror are synchronized. The mirror is employed to facilitate recovery from control plane failure through comparison of the label information database with the mirror. For example, the intersection of the label information database and the mirror may be calculated and employed as the updated label information database and mirror.

17 Claims, 3 Drawing Sheets

CONTROL PLANE FAILURE RECOVERY IN A NETWORK

CROSS-REFERENCE TO RELATED APPLICATIONS

A claim of priority is made to U.S. Provisional Patent Application No. 60/279,927, entitled Distributed Recovery Method for Control Plane Failures in LDP, filed Mar. 29, 2001, which is incorporated by reference.

FIELD OF THE INVENTION

The present invention relates generally to network communications, and more particularly to recovery from control plane failure in a communications network.

BACKGROUND OF THE INVENTION

Techniques for protecting and restoring services from network failures are well known. The techniques typically focus on failures in the data plane, although in some conventional networks the distinction makes little difference. SONET/SDH network failures, for example, necessarily imply simultaneous control plane and data plane failure because control messages and user information are transmitted together in frames. However, recently developed optical network architectures having separate control and data planes present difficulties. Known protection and restoration techniques may be employed with such optical networks to recover from faults in the data plane. However, these techniques appear to be less useful against control plane failure. It would therefore be desirable to have protection and restoration capability for the control plane.

SUMMARY OF THE INVENTION

In accordance with the present invention, selected control plane information is mirrored. The mirrored control plane information may be employed to facilitate restoration of the control plane in the event of failure. In one embodiment, connectivity resource information used by a first device is mirrored on a second device. For example, the information reflects the available channels of the link between the first device and the second device. The devices may be Label Switched Routers ("LSRs"), and the label information may be label tables employed in Multi Protocol Label Switching ("MPLS"). In particular, a copy of the label information database in a downstream LSR is stored on an upstream LSR. Label information that is lost to the downstream LSR can then be recovered from the upstream LSR in the event of control plane failure.

The present invention is advantageously scalable. The label information in each mirror includes only information regarding a specific link. In particular, a mirror in an upstream LSR includes label information only from a downstream LSR label database, although the upstream LSR may maintain multiple mirrors in order to support multiple downstream LSRs. Redundant storage of label information for the network is therefore distributed, thus enabling the network to be more easily scaled than would be possible with a dedicated label information storage device.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
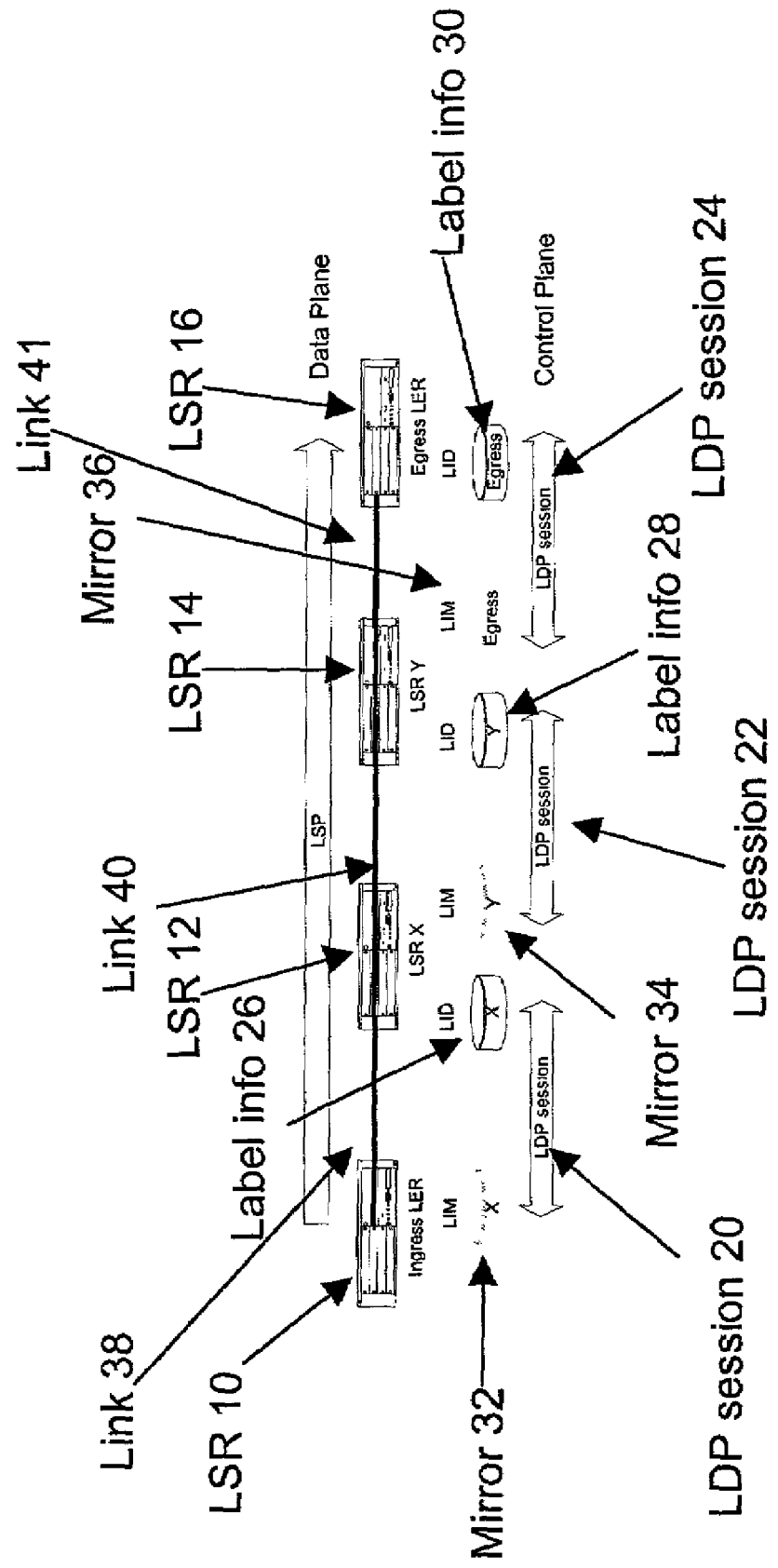
FIG. 1 is a diagram of a portion of a network including a plurality of LSRs having Label Information Mirrors.

FIG. 1 illustrates a portion of an optical network. The network includes nodes such as Label Switched Routers ("LSRs") 10, 12, 14, 16, and links 38, 40, 41, containing one or multiple channels. The LSRs employ Multi-Protocol Label Switching ("MPLS") to facilitate routing of traffic in Label Switched Paths ("LSPs"). Labels are distributed among the LSRs by employing a Label Distribution Protocol ("LDP"), such as constraint based routing LDP ("CR-LDP"). The LDP runs in the control plane of the network, which is physically separate from the data plane. In the illustrated example, the control plane runs over an Ethernet network 18, while the data plane runs over a wavelength routed Dense Wavelength Division Multiplexing ("DWDM") network (not illustrated).

Logically adjacent LSRs, such as LSR 12 and LSR 14, communicate to establish common label information for transmitting traffic between them. Label information is exchanged between logically adjacent LSRs in LDP sessions 20, 22, 24. For example, label information is exchanged between LSR 12 and LSR 14 in LDP session 22. Each LDP session may include a plurality of LDP messages selected from four general types: Discovery messages, Advertisement messages, Session messages, and Notification messages. Discovery messages provide a mechanism whereby LSRs indicate their presence in a network, such as by periodically sending a "Hello" message. "Hello" messages are transmitted via UDP to the LDP port at the "all routers on this subnet" group multicast address. An LDP initialization procedure is employed via TCP transport to establish an LDP session with an LSR discovered via a "Hello" type discovery message. Upon successful completion of the initialization procedure, the two LSRs become LDP peers, and may exchange advertisement messages. Advertisement messages, such as requesting a label or advertising a label mapping to a peer, are transmitted by an LSR based on local decisions made by that LSR. In general, an LSR requests a label mapping from a neighboring LSR when needed, and advertises a label mapping to a neighboring LSR when it is determined that use of the label by the neighbor may be advantageous. Session messages are employed for the actual exchange of label information. Notification messages are employed to notify network events. For example, they are to notify peers about newly available/unavailable channels in the data plane.

Each LSR maintains a label information database ("LID") containing the label information employed by that LSR. In the illustrated example, LSR 12 includes label information database 26, LSR 14 includes label information database 28, and LSR 16 includes label information database 30. Each label information database includes mappings of labels associated with particular Label Switched Paths ("LSPs").

Label Information Mirrors ("LIMs") 32, 34, 36 are created in upstream LSRs to facilitate LDP recovery in the event of control plane failure. Each LIM is a copy of a label information database in a logically adjacent downstream LSR made via an LDP session. For example, LIM 32 in LSR 10 contains the label information from database 26, LIM 34 in LSR 12 contains the label information from database 28, and LIM 36 in LSR 14 contains the label information from database 30. The LIMs may be employed to restore label information that is lost or corrupted in the corresponding label information database.

The LIMs are initialized contemporaneous with LDP session initialization. Type-Length-Value objects ("TLVs") may be employed in the LDP Session Initialization message to facilitate initialization. In particular, an Advertisement of Mirror of Label Information TLV, and an Advertisement of Label Information Database TLV may be employed. The Advertisement of Mirror of Label Information TLV is operative to notify the downstream LSR peer about the contents of the LIM stored in the upstream LSR. The Advertisement of Label Information database TLV is operative to notify the upstream LSR peer about the contents of the label information database stored in the downstream LSR.

Following initialization, each LIM is synchronized with the corresponding downstream label information database. When LSR 14 assigns a label, upstream LSR 12 updates its corresponding LIM 34 after receiving a LDP Label Mapping message from the downstream LSR peer 14. Consequently, both the LIM 34 and the label information database 28 are synchronized after the LSP setting up phase. In the LSP tearing down phase, the upstream LSR 12 updates its LIM 34 when it sends an LDP Label Release message to the downstream LSR peer 14. In this way, both the LIM 34 and the label information database 28 are synchronized after the LSP tearing down phase. The upstream LSR 12 also maintains the LIM 34 when it receives an LDP Notification message from the downstream LSR peer 14. Consequently, in any stable state of the LDP operation, the LIM 34 and the label information database 28 are synchronized.

Figure 2:
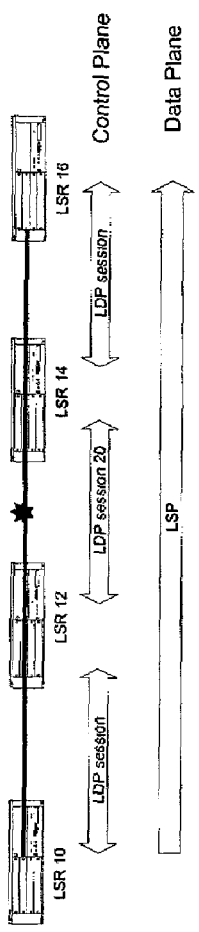
FIG. 2 illustrates control plane link failure in the network of FIG. 1.

FIG. 2 illustrates control plane failure and recovery from link failure. When the control channel failure occurs between LSR 12 and LSR 14, the LDP session 20 closes. Neither the LIM 34 (FIG. 1) residing in LSR 12 nor the label information database 28 (FIG. 1) residing in LSR 14 are emptied. After the failure of the control channel is repaired, LSR 12 re-initializes the LDP session with LSR 14. The contents of the LIM in LSR 12 are transmitted to LSR 14 in an LDP Session Initialization message. LSR 14 compares the contents of the LIM to its own label information database and calculates the intersection. LSR 14 then updates its label information database as the intersection calculated. LSR 14 then transmits the calculated intersection back to LSR 12 in an Advertisement of Label Information Database TLV. Upon receiving the Advertisement of Label Information Database TLV in the LDP Session Initialization message from LSR 14, LSR 12 updates its LIM as the TLV indicates. Hence, the label information is recovered and the user data communication is not interrupted.

Generally, the mirror in LSR 12 and the label information database in LSR 14 are synchronized in any stable state of LDP operation prior to control channel failure. When LSR 14 calculates the intersection of its own label information database and the advertised mirror of label information of LSR 12, the result is identical to either of them. However, when the control channel failure happens before the LDP operation reaches a stable state, their contents could be slightly different.

Figure 3:
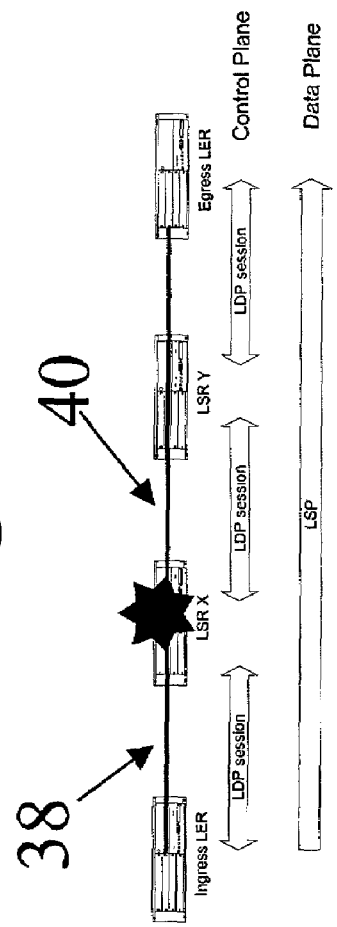
FIG. 3 illustrates control plane node failure in the network of FIG. 1.

Referring to FIGS. 1 and 3, when a LSR is reset and re-initialized, the LIM and the label information database stored in it are set according to actual network configuration. After a single control node failure at LSR 12, the following recovery steps facilitate reset and re-initialized:

1. LSR 12 initializes both its LIM 34 and its label information database 26 according to actual network configuration.
2. LSR 12 sends an LDP Session Discovery message ("Hello" message) to LSR 10 through the link 38 between them.
3. LSR 10 advises LSR 12 about the contents of its mirror 32 in the LDP Session Initialization message.
4. LSR 12 compares the contents of the mirror 32 with its own label information database 26 and calculates the intersection.
5. LSR 12 updates its label information database 26 as the calculated intersection.
6. LSR 12 sends the intersection back to LSR 10 in an Advertisement of Label Information Database TLV.
7. Upon receiving the Advertisement of Label Information Database TLV in the LDP Session Initialization message from LSR 12, LSR 10 updates its LIM 32 as the TLV indicates, at which point the label information database 26 in LSR 12 is recovered and synchronized with its mirror 32.

In parallel with steps 2–7, LSR 12 also recovers its LIM 34 corresponding to its outgoing links. In particular:

1. LSR 12 sends an LDP Session Discovery message ("Hello" message) to the LSR 14 through the link 40 between them.
2. LSR 12 advised LSR 14 about the contents of its LIM 34 in the LDP Session Initialization message. (The contents of its mirror of label information matches the actual link configuration between them.)
3. LSR 14 compares the contents of the LIM 34 with its own label information database 28 and calculates the intersection.
4. LSR 14 updates its label information database 28 as the calculated intersection. (This should not affect the contents of its label information database, because the advertised LIM 34 is a superset of its label information database.)
5. LSR 14 sends the intersection back to LSR 12 in an Advertisement of Label Information Database TLV.
6. Upon receiving the Advertisement of Label Information Database TLV in the LDP Session Initialization message from LSR 14, LSR 12 updates its mirror of label information as the TLV indicates. (Now the mirror of label information in LSR 12 is recovered and synchronized with its counterpart.)

Figure 4:
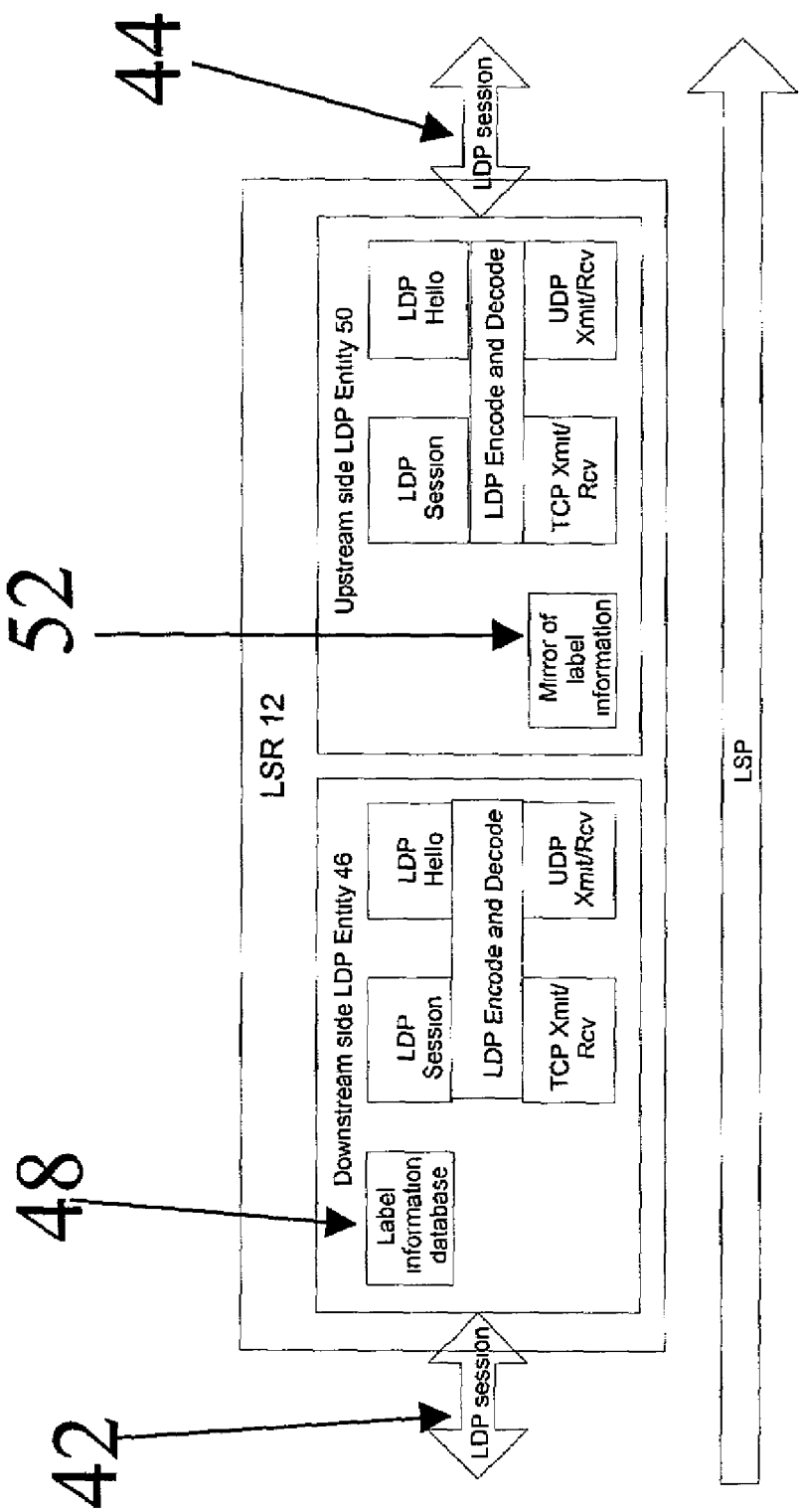
FIG. 4 illustrates the LSRs of FIG. 1 in greater detail.

FIG. 4 illustrates LSR 12 (FIG. 1) in greater detail. LSR 12 has one incoming link 42 and one outgoing link 44. There is one downstream side LDP entity 46 corresponding to each incoming link. And each downstream side LDP entity 46 has a private label information database 48. Consequently, label information is stored on a per link basis. Similarly, there is one upstream side LDP entity 50 corresponding to each outgoing link 44. And each upstream side LDP entity 50 has it own mirror of label information (LIM) 52. Consequently, the label information database 48 has meaning with respect to only one LDP entity 46 and one link 42. Similarly, the mirror of label information 52 has meaning with respect to only one LDP entity 50 and one link 44. Different LDP entities in one LSR may employ different TCP/UDP port numbers to communicate with peers.

In an alternative embodiment, the present invention could be employed with a centralized recovery mechanism. The centralized recovery mechanism could be beneficial for inter-domain recovery. More particularly, if the control plane of a whole domain fails, and some kind of centralized control plane backup is provided for that domain, the control information can be recovered through a centralized method.

The present invention may also be employed to facilitate protection and restoration of control channels by using backup control channels. If recovery from failures in the control plane can be accomplished by using backup control channels, LDP sessions will not sense the failures and will not take any recovery action. Recovery by backup control channels may be preferable, in general. If the control plane cannot be recovered within a time bound, the TCP and LDP layer would then take action.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as disclosed herein.

What is claimed is:

1. A device operative in a communications network having a downstream network node capable of label switched routing, where the device is upstream relative to the network node, comprising:
   at least one port operative to receive control plane information from said downstream network node, including a label information database having mappings between labels and label switched paths ("LSPs") for a link between the device and the downstream network node; and
   a memory portion operative to mirror control plane information received from said downstream network node via said at least one port.

2. The device of claim 1 wherein said label information database is maintained by said network node, and said device is further operative to synchronize said memory portion with said label information database.

3. The device of claim 2 further operative, following failure of a control plane communication link between said device and said node, to transmit said mirrored control plane information to said node.

4. The device of claim 3 further operative, following failure of the control plane communication link between said device and said node, to update said memory portion with the intersection of said transmitted mirrored control plane information and the control plane information maintained by said network node.

5. The device of claim 1 further including a plurality of memory portions, each operative to mirror a label information database for a particular link.

6. A communications network, comprising:
   a first, downstream device having a first memory and a first port;
   a second device, upstream relative to the first device, having a second memory and a second port operative to exchange information with said first port associated with said first device via a communication link, a portion of said second memory operative to store control plane information,
   wherein said second device is operative to transmit at least a portion of said control plane information to said first, downstream device, and said first, downstream device is operative to receive said control plane information and store said received control plane information in said first memory as mirrored control plane information,
   wherein the mirrored control plane information includes a label information database.

7. The communications network of claim 6 wherein the label information stored in said first memory is synchronized with said corresponding label information stored in said second device.

8. The communications network of claim 7 wherein, following a control plane failure, said first device is operative to transmit said label information stored in said first memory to said second device.

9. The communications network of claim 8 wherein, following receipt of said label information by said second device, said second device is operative to compare said received label information with corresponding label information remaining in said second memory.

10. The communications network of claim 9 wherein following comparing said sets of label information, said second device is operative to employ the intersection of said sets of label information for communications on the corresponding link.

11. The communications network of claim 10 wherein said second device is further operative to provide the intersection of said sets of label information to said first device.

12. The communications network of claim 11 wherein said first device is operative to update said first memory by storing the intersection of said sets of label information transmitted from the second device.

13. A method for facilitating recovery from a control plane failure in a communications network having a first, upstream device and a second, downstream device in communication via a link, wherein control plane information is maintained by said second device, comprising the steps of:
   transmitting, by said second, downstream device, said control plane information upstream to said first device;
   receiving, by said first device, said control plane information from said seconds downstream device; and
   storing said control plane information by said first, upstream device for facilitating recovery from a control plane failure,
   wherein the control plane information includes a label information database.

14. The method of claim 13 including the further step of synchronizing said control plane information stored by said first device with said control plane information maintained by said second device.

15. The method of claim 14 including the further step of, following control plane failure, determining the intersection between entries in said control plane information maintained by said second device and said control plane information stored by said first device.

16. The method of claim 15 including the further step of updating said control plane information maintained by said second device and said control plane information stored by said first device with said intersection of control plane information.

17. The method of claim 16 including the further step of said first device and said second device employing said intersection of control plane information to transmit data via said link.

* * * * *